United States Patent [19]

Namba et al.

[11] Patent Number: 4,771,848
[45] Date of Patent: Sep. 20, 1988

[54] VEHICLE ACCELERATION CONTROL SYSTEM

[75] Inventors: Hideaki Namba, Oobu; Eiichi Kamei, Nagoya; Masahiro Ohba, Okazaki, all of Japan

[73] Assignee: Nippondenso Co., Ltd., Kariya, Japan

[21] Appl. No.: 942,438

[22] Filed: Dec. 16, 1986

[30] Foreign Application Priority Data

Dec. 19, 1985 [JP] Japan ............................. 60-287475

[51] Int. Cl.$^4$ ............................................. B60K 31/00
[52] U.S. Cl. .................................... 180/197; 123/352; 364/426.04
[58] Field of Search ................. 180/197, 233; 123/339, 123/352, 336; 364/424, 424.1, 426

[56] References Cited

U.S. PATENT DOCUMENTS

| | | | |
|---|---|---|---|
| 3,938,612 | 2/1976 | Boudeville et al. | 180/197 |
| 4,615,410 | 10/1986 | Hosaka | 180/197 |
| 4,637,487 | 1/1987 | Nakamura et al. | 123/336 X |

FOREIGN PATENT DOCUMENTS

| | | | |
|---|---|---|---|
| 54-42077 | 12/1979 | Japan . | |
| 58-38347 | 3/1983 | Japan . | |
| 167845 | 10/1983 | Japan | 180/197 |
| 2154763 | 9/1985 | United Kingdom | 123/352 |

Primary Examiner—John J. Love
Assistant Examiner—Mitchell J. Hill
Attorney, Agent, or Firm—Cushman, Darby & Cushman

[57] ABSTRACT

The required rate of acceleration of a vehicle is detected. The speed of the vehicle is detected. The rotational speed of a vehicle driving wheel is detected. An air adjusting device adjusts the rate of air flow into a vehicle powering engine in accordance with an adjustable controlled quantity. A target rotational speed is determined on the basis of the detected required acceleration rate. The controlled quantity of the air adjusting device is feedback-controlled so that the detected rotational speed of the driving wheel essentially equals the target rotational speed. The output torque of the engine is estimated in accordance with the detected rotational speed of the driving wheel and the controlled quantity of the air adjusting device. Specifically, an integral-added optimal regulator determines the controlled quantity of the air adjusting device in accordance with an optimal feedback gain the estimated engine output torque, the detected rotational speed of the driving wheel, and the target rotational speed. The integral-added optimal regulator performs the feedback control based on this information. The optimal feedback gains are predetermined according to a dynamic model of a system powering the driving wheel.

17 Claims, 7 Drawing Sheets

VEHICLE ACCELERATION CONTROL SYSTEM

BACKGROUND OF THE INVENTION

1. Field of the Invention

This invention relates generally to a vehicle acceleration control system and specifically to a traction control system for preventing or limiting the slip of vehicle wheels to enable a smooth start and maximize acceleration of a vehicle.

2. Description of the Prior Art

Some known vehicle slip control systems perform traction control for adjusting the rotation of vehicle driving wheels to maximize friction between the driving wheels and the road surfaces and thereby to prevent or control slip of the driving wheels during acceleration of the vehicle. This slip control improves the vehicle running stability and the vehicle acceleration ability.

Japanese published examined patent application No. 54-42077 discloses such a vehicle slip control system. In the system disclosed in this published application, when the degree of slip of the vehicle driving wheels exceeds a reference value, misfire a of a vehicle powering engine is forcedly induced or the fuel supply to the engine is cut off to reduce the engine power output to control rotation of the driving wheels. The reference value of slip is periodically determined and updated in accordance with deduced conditions of road surfaces. The periodic updating of the slip reference value can deteriorate the response characteristics of the slip control. The deteriorated response characteristics of the slip control sometimes cause an unstable acceleration of the vehicle. In addition, the misfire generally increases polluting emission from the engine. Furthermore, the misfire and the fuel cut off may result in a sudden change of the operating state of the engine which can cause unacceptable shock or vibration of the engine.

Japanese published unexamined patent application No. 58-38347 discloses a vehicular engine control system which performs vehicle wheel slip control. In the system disclosed in this published application, the speed of vehicle driving wheels is compared to the speed of the vehicle idler or non-driving wheels to determine the slip ratio of the driving wheels. When the difference between the driving wheel speed and the idler wheel speed exceeds a reference value, the torque transmitted to the driving wheels from an engine is reduced by cutting off the fuel supply to the engine and by forcedly changing the gear ratio in a power transmission, and the sudden reduction of the fuel supply to the engine can increase polluting emission from the engine. The forced change of the transmission gear ratio impair fuel economy of the engine. As described previously, the fuel cut off results in a sudden change of the operating state of the engine which can cause unacceptable shock or vibration of the engine.

SUMMARY OF THE INVENTION

It is an object of this invention to provide a system which enables smooth and stable acceleration of a vehicle.

In a vehicle acceleration control system according to a first aspect of this invention, the required rate of acceleration of a vehicle is detected and the speed of the vehicle is also detected. In addition, the rotational speed of a vehicle driving wheel is detected. An air adjusting device adjusts the rate of air flow into a vehicle powering engine in accordance with an adjustable controlled quantity. A target rotational speed is determined in accordance with the detected required acceleration rate. The target rotational speed has an upper limit equal to a rotational speed of the driving wheel corresponding to a preset slip ratio with respect to the detected vehicle speed. The controlled quantity of the air adjusting device is feedback-controlled so that the detected rotational speed of the driving wheel essentially equals the target rotational speed. The output torque of the engine is estimated in accordance with the detected rotational speed of the driving wheel and the controlled quantity of the air adjusting device. An integral-added optimal regulator determines the controlled quantity of the air adjusting device using optimal feedback gains, the estimated engine output torque, the detected rotational speed of the driving wheel and the target rotational speed. The optimal feedback gas is predetermined according to a dynamic model of a system powering the driving wheel.

In a vehicle acceleration control system according to a second aspect of this invention, the actual speed of a vehicle driving wheel is detected and a target speed of the driving wheel is determined. The output of a vehicle powering engine is controlled at an adjustable controlled quantity so that the actual driving wheel speed essentially equals the target driving wheel speed. The internal state of the engine is estimated. The controlled quantity in the engine output control is determined in accordance with the estimated internal state of the engine.

DESCRIPTION OF THE GENERAL PREFERRED EMBODIMENT

Figure 1:
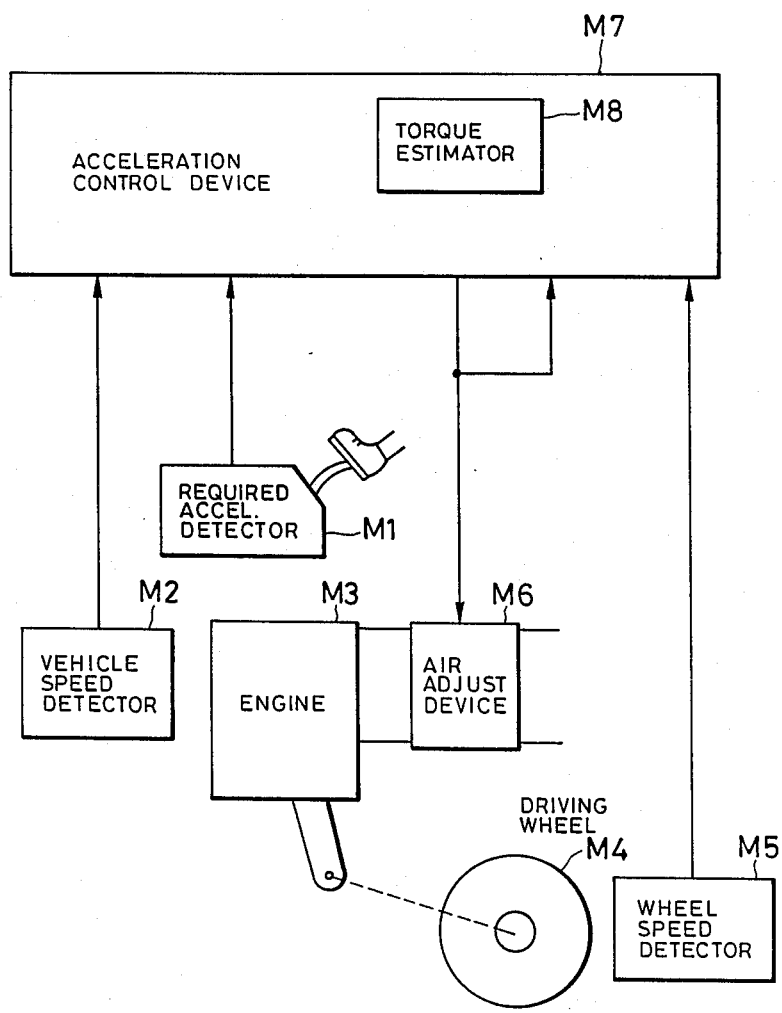
FIG. 1 is a diagram of a vehicle acceleration control system according to a general embodiment of this invention.

With reference to FIG. 1, a vehicle acceleration control system includes a device M1 detecting a required rate of acceleration of a vehicle and generating a signal indicative thereof. The required acceleration detector M1 includes a sensor detecting the degree of depression of a manually-operated member or an accelerator pedal. The vehicle is powered by an engine M3, the power output of which is normally controlled to increase with the degree of depression of the accelerator pedal. Since the accelerator pedal is operated by the vehicle driver in accordance with driver's demand, the degree of depression of the acceleration pedal represents a required power output of the engine and also a required rate of acceleration of the engine or the vehicle.

A device M2 detects the speed of the vehicle and generates a signal indicative thereof. The vehicle speed detector M2 preferably includes a sensor for monitoring the rotational speed of a vehicle idler wheel. The vehicle speed detector M2 may also include a ground speed sensor using Doppler effect. Also, the vehicle speed detector M2 may be the type that includes both a vehicle idler wheel speed sensor and a vehicle acceleration sensor. In this type of the detector M2, the current vehicle speed is calculated from a base value and an additive value, and the base value equals the previous vehicle speed derived from the sensed wheel speed at a moment immediately prior to the start of application of the brake to the wheel, the additive value is being derived by successively integrating the sensed vehicle acceleration or deceleration.

The engine M3 is preferably of the internal combustion type, such as a normal four-cycle multi-cylinder internal combustion engine or a Wankel internal combustion engine. The engine M3 may be a single-cylinder engine or a two-cycle engine. The engine may also be of other types.

The vehicle includes a driving wheel or wheels M4 in contact with the road surfaces. The driving wheels M4 are mechanically coupled to the engine M3 so that they are powered by the engine M3. As the driving wheels M4 are powered by the engine M3, friction between the wheels M4 and the road surfaces allows the vehicle to move.

A device M5 detects the rotational speed of the driving wheel M4 and generates a signal indicative thereof. Specifically, the device M5 detects the number of revolutions of the driving wheel M4 during a unit time interval or detects the distance of movement of the driving wheel M4 along the contacting road surface during a unit time interval. For example, the driving wheel speed detector M5 reads magnetic or optical marks rotating together with the driving wheel M4 and outputs an ON/OFF or binary signal reflecting movement of the marks.

A device M6 adjustably meters or determines the rate of air flow into the engine M3. The air flow rate is controllable via a signal applied to the device M6. The air adjustment device M6 preferably includes a rotatable throttle valve and a controllable actuator linked to the throttle valve. The throttle valve is disposed within an air intake passage of the engine M3. The degree of opening of the throttle valve varies as a function of its position, so that the rate of air flow into the engine M3 depends on the position of the throttle valve. The position of the throttle valve can be varied by controlling the actuator. In spark ignition internal combustion engines, the rate of fuel supply is adjusted in accordance with the rate of air supply by a fuel supply control system (not shown) or a carburetor (not shown) so that the air/fuel ratio of the air-fuel mixture can be essentially constant. Accordingly, adjustment of the air flow rate allows control of the air-fuel mixture supply rate and thus enables control of the power output from the engine M3.

A control device M7 receives the required acceleration rate signal, the vehicle speed signal, and the driving wheel speed signal from the detectors M1, M2, and M5. The control device M7 outputs the control signal to the air adjustment device M6. The control device M7 determines a desired or target rotational speed of the driving wheel M4 on the basis of the required acceleration rate and the detected vehicle speed. Furthermore, the control device M7 adjusts the power output of the engine M3 via the air adjustment device M6 in accordance with the target driving wheel speed and the detected driving wheel speed in feedback control so that the actual driving wheel speed can follow or essentially equal the target driving wheel speed.

The control device M7 includes a section M8 which estimates or deduces the output torque of the engine M3 from the detected rotational speed of the driving wheel M4 and a controlled quantity represented by the control signal to the air adjustment device M6.

The control device M7 is mainly composed of an integral-added optimal regulator performing the above-mentioned feedback control in which the controlled quantity of the air adjustment device M6 is determined in accordance with optimal feedback gain, the above-mentioned estimated engine torque output, the detected driving wheel speed, and the target driving wheel speed. The optimal feedback gains are predetermined according to a dynamic model of the system powering the driving wheels M4.

In more detail, the control device M7 includes an electronic circuit composed of a microcomputer system which has the combination of a central processing unit (CPU), a read-only memory (ROM), a random-access memory (RAM), and an input/output (I/O) circuit. The control device M7 operates in accordance with a program stored in the ROM.

As described previously, the control device M7 constitutes an integral-added optimal regulator which controls the air adjustment device M6 in accordance with vehicle parameters including the required acceleration rate and the vehicle speed detected via the devices M1 and M2. A controlled quantity of the air adjustment device M6 is determined in accordance with optimal feedback gains, an estimated output torque of the engine M3, the detected driving wheel speed, and the calculated target driving wheel speed. The optimal feedback gains are predetermined according to a dynamic model of a system powering the driving wheels M4. The estimated output torque of the engine M3 is determined by the torque estimating section M8.

Preferably, in the case of vehicle or engine acceleration at vehicle driving wheel slip ratios less than a preset value, the target rotational speed of the driving wheel M4 is determined in accordance with the required acceleration rate. In the case of vehicle or engine acceleration at vehicle driving wheel slip ratios equal to or higher than the preset value, the target rotational speed of the driving wheel M4 is determined in accordance with the detected vehicle speed and the preset slip ratio. When the preset slip ratio is chosen to be 20%, the target driving wheel speed is preferably set equal to the detected vehicle speed multiplied by a value of 1.2. It should be noted that the slip ratio S is given by the following equation:

$$S = 100(V1 - V0)/V0$$

where V1 denotes the speed of the driving wheel M4 at the contacting road surface and V0 denotes the vehicle speed.

In general, the vehicle acceleration is optimized when the slip ratio is around 20%.

The torque estimating section M8 includes a state estimator which deduces the torque output of the engine M3 from the detected driving wheel speed and the controlled quantity represented by the control signal to the air adjustment device M6. The state estimator can be an observer or a Kalman filter.

The integral-added optimal regulator formed by the control device M7 will be described in detail hereinafter. The integral-added optimal regulator is designed in a known way. In modern control theory, there are well-known methods of constituting integral-added optimal regulators as disclosed in the book "Linear System Control Theory" written by Katsuhisa FURUTA, published from Shokodo Japan in 1976. In the following description, the letters F, X, A, B, C, y, u, L, G, Q, R, T, P, and M represent vectors or matrices. The superscript $T$ attached to a matrix or vector represents the transpose of the matrix or vector. For example, the character $A^T$ represents the transpose of the matrix A. The superscript $-1$ attached to a matrix represents the inverse of the matrix, that is, the inverse matrix. For example, the character $A^{-1}$ represents the inverse matrix with respect to the matrix A. The character $\hat{\ }$ attached to a vector or matrix, for example $\hat{X}$, represents that the vector or matrix is an estimate. The character $-$ attached to a vector or matrix, for example $\bar{C}$, represents that the vector or matrix is used in a secondary system derived from a primary system of a controlled object by a transform or the like, and is used specifically in a state estimator formed by the torque estimating device M8. The character * attached to a vector or matrix, for example y*, represents that the vector or matrix is target or reference.

According to well-known modern control theory, in control of the controlled object, that is, the engine M3, the dynamic behavior of the controlled object is expressed by the following equations:

$$X(k) = A \cdot X(k-1) + B \cdot u(k-1) \quad (1)$$

$$y(k) = C \cdot X(k) \quad (2)$$

where X(k) denotes state variables representative of the internal state of the engine M3, u(k) denotes an input vector having components representative of operating conditions of the engine M3, and y(k) denotes an output vector having components representative of the outputted operating state of the engine M3. The equations (1) and (2) are conventionally referred to as a state equation and an output equation respectively. The equations (1) and (2) are defined in a discrete-time system. In the equations (1) and (2), the adscript (k) represents that the associated vactor values are obtained at the present sampling, and the adscript character (k−1) represents that the associated vector values are obtained at the preceding sampling.

The state variables X(k) representing the internal state of the engine M3 includes information related to a history of the controlled system necessary and adequate to predict or estimate influences on future states of the controlled system. Accordingly, the operation of the engine M3 can be optimally controlled by using the state variables X(k), provided that a dynamic model of the system related to operation of the engine M3 can be determined and that the values A, B, and C in the equations (1) and (2) can also be determined. When the system is applied to servo control, it is necessary to expand the system as will be described hereinafter.

Generally, it is difficult to theoretically determine an accurate dynamic model of such a complicated object as an engine, so that an experimental approach is necessary to obtain an accurate dynamic model. This experimental approach is model construction technique referred to as system identification. According to this system identification, a dynamic model is determined by referring to the equations (1) and (2) while taking the following matter into consideration. In cases where the engine M3 is operating in a state near a given steady state, the current state of the engine M3 can be accurately estimated on the basis of the given steady state of the engine M3 through linear approximation. Although a dynamic model of operation of the engine M3 is generally non-linear, the linear approximation can be applied when the engine operation or state is decomposed into plural steady engine operating states. In this case, dynamic models can be determined for the respective decomposed engine operating states.

In the case of a controlled object whose physical model can be constructed easily, a dynamic model of the system, that is, the parameters A, B, and C, can be determined by system identification using known technique, such as frequency response method or spectrum analysis technique. On the other hand, in the case of a controlled object with multivariables, such as an engine, an accurately approximated physical model is generally unavailable and therefore a dynamic model is constructed by technique such as least squares method, instrumental variable method, or on-line identification.

When the dynamic model is determined, a feedback quantity is derived from the state variables X(k), the output vector y(k), and its target vector y* so that optimal controlled quantities of the input operating condition values u(k) are theoretically determined. In the case of an engine, the state variables X(k) are composed of parameters or conditions directly affecting operation of the engine, such as the actual rate of air flow into the engine, the dynamic behavior of mixture combustion, the rate of fuel supply to the engine, and the output torque of the engine.

Generally, it is difficult to directly measure the engine output torque. Accordinly, the control device M7 in this invention includes the state estimator or observer, that is, the torque estimating section M8 which deduces the engine output torque from the values (the input controlled quantities) of the engine operating conditions and the values (the output quantity) of the engine operating state. In modern control theory, there are various known state estimators or observers and several known ways of designing the state estimators or observers as disclosed in the book "Mechanical System Control" written by Katsuhisa FURUTA, published from Ohm Co. Ltd. in 1984. In this invention, the state estimator is composed of a minimal order observer, a finite time settling observer, or a Kalman filter designed in accordance with structures and aspects of the engine M3, the driving wheels M4, and the engine operating state control devices.

The control device M7 determines an accumulated value of the difference beteween the target speed of the driving wheel M4 and the actual speed of the driving wheel M4. In an expanded system, the control device M7 determines an optimal feedback quantity in accordance with the estimated engine output torque, the accumulated value, and the predetermined optimal feedback gains, and controls the air adjustment device M6 in agreement with the determined optimal feedback quantity. The accumulated value is necessary in determining the optimal feedback quantity, since the target driving wheel speed depends on the required rate of acceleration of the engine M3. In control of a servo system, a particular operation is generally necessary in order to nullify a steady error or difference between a target value and an actual value, so that a transfer function is usually necessitated to include $1/S^l$ (l-th order integral). In cases where state and output equations are determined in accordance with a transfer function derived through the previously-mentioned system identification, it is desirable that the transfer function includes such a integral factor from the standpoint of the stability against noises. In a preferred aspect of this invention, the value l equals 1 and only the first-order integral is considered. Accordingly, when the system is expanded by adding the accumulated value to the above-mentioned estimated engine output torque and then an optimal feedback quantity is derived from the predetermined optimal feedback gain F and the resultant of the addition, an optimal control quantity of the air adjustment device M6 is determined in an integral-added optimal regulator.

The optimal feedback gains will be described hereinafter. In optimizing regulators where an integral factor is added as in the previously-mentioned case, it is known to determine a control input (the control quantity of the air adjustment device M6 in this invention) which minimizes a performance index J. Also, it is known that optimal feedback gains can be derived from a solution of Riccati equation, the matrices A, B, and C in the state equation (1) and the output equation (2), and a weight parameter matrix in the performance index J (see the previously-mentioned book). The weight parameters are originally set to arbitrary values. The performance index J corrects the original weight parameters restricting the behavior of the above-mentioned controlled quantity. Specifically, a simulation with arbitrary weight parameters is performed by a large computer. Then, the weight parameters are corrected in accordance with the behavior of the resulting output, that is, the behavior of the speed of the driving wheel M4. A second simulation is performed with the corrected weight parameters. The weight parameters are further corrected in accordance with the result of the second simulation. Reiteration of this process can determine optimal weight parameters from which an optimal feedback gain vector F is derived.

In this way, the control device M7 in the vehicle acceleration control system of this invention is composed of an integral-added optimal regulator by use of a dynamic model of actuation of the driving wheels M4 by the engine M3. The dynamic model is predetermined by system identification or the like. In addition, the optimal feedback gain vector F and the parameters used in the torque estimating section M8 within the control device M7 are predetermined via simulation using a vehicle powered by the engine M3.

In operation of the vehicle acceleration control system of this invention, the control device M7 determines a target speed of the driving wheel M4 in accordance with the required vehicle acceleration rate represented by the signal from the detector M1. The target driving wheel speed has an upper limit which is determined in accordance with a reference slip ratio and the vehicle speed detected via the device M2.

The speed of the driving wheels M4 is feedback controlled in accordance with the target driving wheel speed. In this feedback control, the control device M7 operates as an integral-added optimal regulator which determines a controlled quantity of the air adjustment device M6 in accordance with a deduced output torque of the engine M3, the actual driving wheel speed detected via the device M5, the target driving wheel speed, and optimal feedback gains. The air adjustment device M6 is thus controlled at the determined controlled quantity. The torque estimating section M8 within the control device M7 is informed of the controlled quantity of the air adjustment device M6. The torque estimating section M8 deduces the engine output torque from the controlled quantity of the air adjustment device M6 and the detected driving wheel speed. The optimal feedback gains are predetermined by simulation using a dynamic model of the system powering the driving wheel.

It should be noted that the control device M7 may adjust the rate of fuel supply to the engine M3 in place of the air adjustment for the engine power output control. Such a modification is suitable for compression combustion engines, such as diesel engines.

DESCRIPTION OF THE SPECIFIC EMBODIMENT

Figure 2:
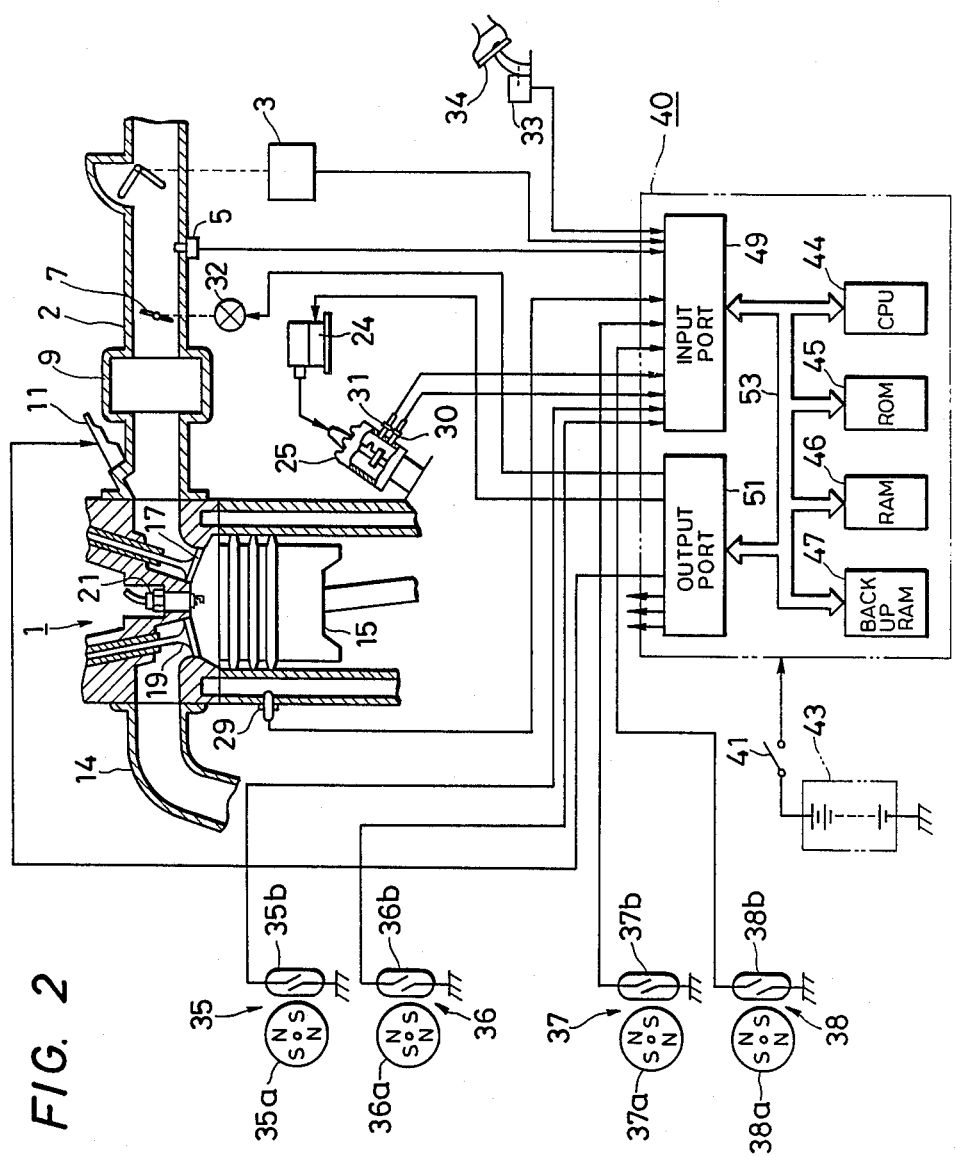
FIG. 2 is a diagram of a vehicle acceleration control system according to a specific embodiment of this invention.

With reference to FIG. 2, a four-cylinder four-cycle internal combustion engine 1 is provided with an air intake system 2 extending between an air cleaner (not shown) and a main block of the engine 1. Air is drawn into the engine 1 via the air intake sytem 2. Air flow meter 3 disposed in the air intake system 2 measures the rate of air flow into the engine 1 and generates a signal indicative thereof. A temperature sensor 5 attached to the air intake system 2 measures the temperature of intake air, represented by the character Tha, and generates a signal indicative thereof. A rotatable throttle valve 7 disposed in the air intake system 2 downstream of the air flow meter 3 adjustably determines the rate of air flow into the engine 1. The air intake system 2 is formed with a surge tank 9 downstream of the throttle valve 7. An electromagnetic fuel injection valve or valves 11 attached to the air intake sytem 2 serve to inject fuel into the air intake system 2 downstream of the surge tank 9 at an adjustable rate. The engine 1 is also provided with an exhaust system including an exhaust pipe arrangement 14 extending from the engine block. Exhaust gases from the engine 1 move to the atmosphere via the exhaust pipe arrangement 14. The exhaust system includes an exhaust scrubber (not shown) and a muffler (not shown). The engine block has cylinders in which pistons 15 are slidably disposed. Inlet valves 17, outlet valves 19, and spark plugs 21 are disposed in the engine block in conventional ways.

A temperature sensor 29 attached to the engine block measures the temperature of engine coolant, represented by the character Thw, and generates a signal indicative thereof. A rotational speed sensor 30 arranged in a distributor 25 generates a pulse signal whose frequency depends on the rotational speed of the engine 1 represented by the character N. A cylinder discrimination sensor 31 arranged in the distributor 25 generates a single pulse signal each time the engine crankshaft rotates through 720°. The position of the throttle valve 7, that is, the degree of opening through the throttle valve 7, is adjusted via a controllable actuator 32 including a mechanical power source composed of a dc motor. The character $\theta$ represents the position of the throttle valve 7, that is, the degree of opening through the throttle valve 7. A position sensor 33 associated with an accelerator pedal 34 measures the degree of depression of the accelerator pedal 34, represented by the character Acc, and generates a signal indicative thereof.

Sensors 35, 36, 37, and 38 associated with a right-hand vehicle front wheel, a left-hand vehicle front wheel, a right-hand vehicle rear wheel, and a left-hand vehicle rear wheel generate signals indicative of their rotational speeds, respectively. Specifically, the vehicle wheel rotational speed sensor 35 includes a rotatable disc 35a and a fixed reed switch 35b. The disc 35a is connected to the axle of the right-hand vehicle front wheel so that it rotates together with the wheel. The disc 35a has magnetic poles. The reed switch 35b is located near the disc 35a. As the disc 35a rotates, the reed switch 35 periodically moves between a closed position and an open position and thus generates an ON/OFF pulse signal in response to rotation of the magnetic poles. The frequency of the signal from the reed switch 35a depends on the rotational speed of the right-hand vehicle front wheel. The other vehicle wheel rotational speed sensors 36, 37, and 38 include discs 36a, 37a, and 38a, and reed switches 36b, 37b, and 38b, respectively. The internal design of these sensors 36-38 is similar to that of the previously-mentioned sensor 35.

The rate of fuel injection into the engine 1 represented by the character fr, and also the throttle opening degree $\theta$ are controlled via an electronic control circuit 40. The control circuit 40 is electrically connected to a power supply or battery 43 via a key switch 41. When the key switch 41 is closed, the control circuit 40 is powered by the battery 43. The control circuit 40 includes a microcomputer unit having the combination of a microprocessor (MPU) 44, a read-only memory (ROM), a main random-access memory (RAM) 46, a backup RAM 47, an input port 49, and an output port 51 connected mutually via a bus 53.

The input port 49 within the control circuit 40 receives the signals, representative of the demand on the engine 1 and the operating state of the engine 1, from the sensors. Specifically, the unit 49 includes an analog input section which receives the demand signal representative of the accelerator depression degree Acc from the accelerator position sensor 33, the operating state signal representative of the air flow rate AR from the air flow meter 3, the operating state signal representative of the intake air temperature Tha from the air temperature sensor 5, and the operating state signal representative of the engine coolant temperature Thw from the coolant temperature sensor 29. The analog input section of the unit 49 converts the received signals into corresponding digital signals through analog-to-digital conversion. The resulting digital signals are fed to the MPU 44. The unit 49 includes a pulse input section which receives the signal representative of the engine speed N from the speed sensor 30, the cylinder discrimination signal from the sensor 31, and the signals representative of the vehicle wheel speeds from the speed sensors 35-38.

The output port 51 feeds control signals to the actuator 32, the fuel injection valve or valves 11, and an igniter 24. The control signal to the actuator 32 adjustably determines the opening degree $\theta$ of the throttle valve 7. The control signal to the fuel injection valve or valves 11 adjustably determines the fuel injection rate fr. The control signal to the igniter adjustably determines the timing of the periodical generation of spark in the engine 1. The control circuit 40 performs spark timing control in a conventional way.

Figure 3:
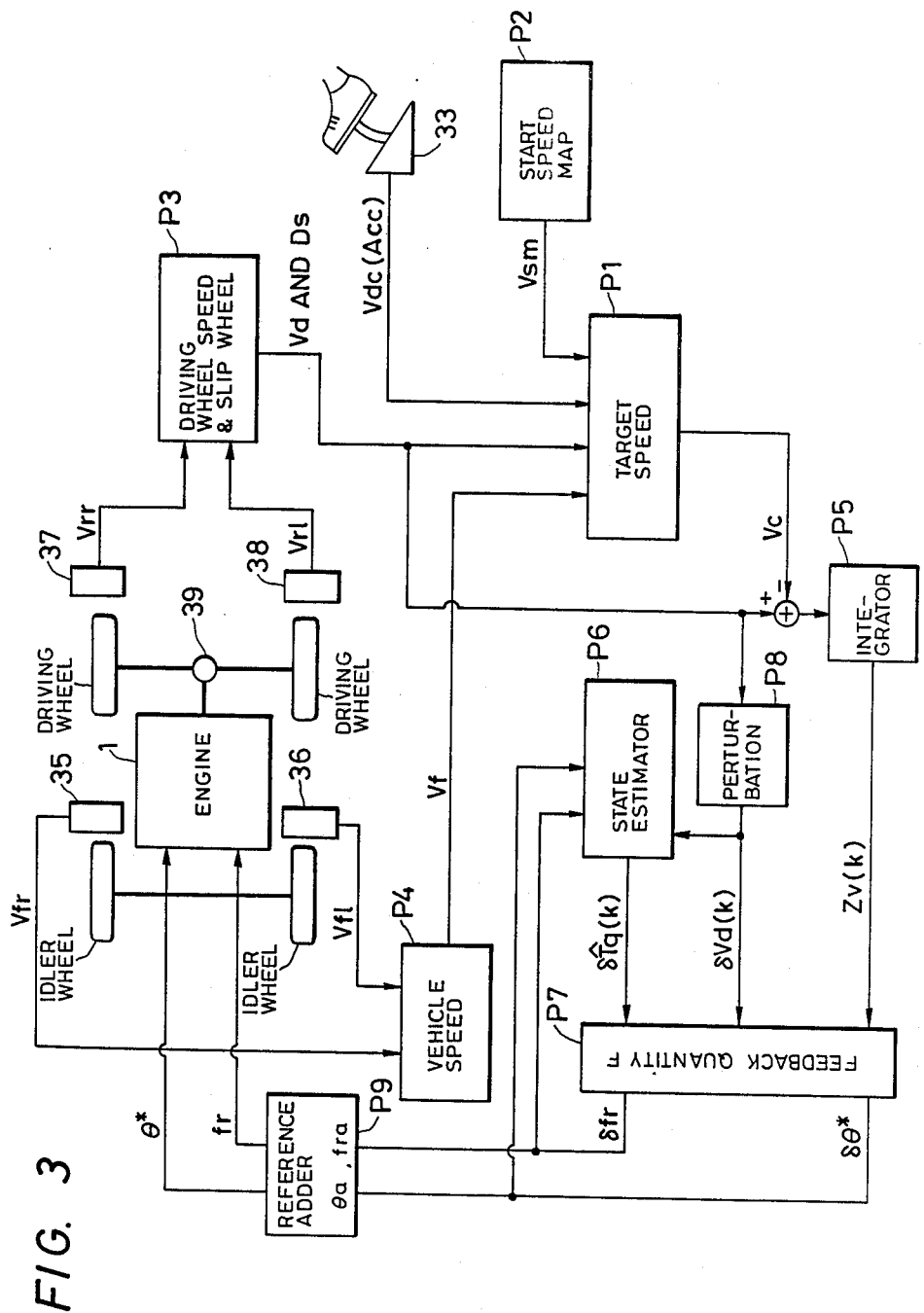
FIG. 3 is a flow diagram of control executed by the system of FIG. 2.

Operation of the control circuit 40 will be described hereinafter with reference to FIG. 3. In addition, there will be detailed descriptions of the determination of parameters A, B, and C in the state equation (1) and the output equation (2) through system identification, the design of an observer on the basis of the determined parameters, and the determination of feedback gains. It should be noted that FIG. 3 is a flow diagram of control executed by the control circuit 40 and does not show the hardware structure of the control circuit 40. In addition, the operation in FIG. 3 is performed in line with control programs of FIGS. 7 and 8 and is actualized in a discrete-time system.

As shown in FIG. 3, a target rotational speed determination section P1 receives the accelerator depression degree Vdc (Acc) derived from the signal outputted by the sensor 33. A start rotational speed map P2 outputs map data Vsm to the target rotational speed determination section P1. A driving wheel rotational speed/slip wheel detection section P3 supplies the target rotational speed determination section P1 with the driving wheel rotational speed Vd and slip wheel detected data Ds. A vehicle speed determination section P4 derives the vehicle speed Vf from the rotational speeds Vfr and Vfl of the idler vehicle wheels (the vehicle front wheels) which are represented by the signals from the speed sensors 35 and 36. The vehicle speed data Vf are fed to the target rotational speed determination section P1. This section P1 determines a command or target value Vc of the rotational speed of the driving wheels (the vehicle rear wheels) in accordance with the above-mentioned data Vdc (Acc), Vsm, Vd, Ds, and Vf. In the case of normal acceleration, the target rotational speed Vc is determined in accordance with the accelerator depression degree Vdc (Acc). During such normal acceleration, the driving wheel slip rate determined via comparison between the vehicle speed data Vf and the driving wheel rotational speed Vd exceeds 20%, the target rotational speed determination section P1 calculates and outputs the target rotational speed Vc designed to decrease the slip ratio to a preset slip ratio at which the vehicle develops a maximal acceleration. In the case of vehicle start from zero speed, e.g., in the case of acceleration to move the vehicle from a state of rest, the target rotational speed Vc is determined by referring to the start rotational speed map P2 stored in the ROM 45.

The driving wheel speed Vd determined in the driving wheel rotational speed/slip wheel detection section P3 is usually a mean value between the right-hand vehicle rear wheel rotational speed Vrr and the left-hand vehicle rear wheel rotational speed Vrl derived from the signals outputted by the speed sensors 37 and 38. Accordingly, the driving wheel rotational speed Vd corresponds to the rotational speed of a driving shaft connected between an differential gear arrangement 39 and a transmission. It should be noted that the driving wheel rotational speed Vd may be detected on the basis of the engine speed N and the gear ratio in the transmission. The engine speed data N are derived from the signal outputted by the speed sensor 30. In the case where a response to slip of the right-hand driving wheel and a response to slip of the left-hand driving wheel are differentiated to provide finer control, both the right-hand wheel data Vrr and the left-hand wheel data Vrl are directly used for the determination of the final data Vd, or the engine speed data N and one of the right-hand wheel data Vrr and the left-hand wheel data Vrl are used for the determination of the final data Vd.

The vehicle speed determination section P4 calculates a mean value between the detected rotational speeds Vfr and Vfl of the right-hand vehicle idler wheel and the left-hand vehicle idler wheel represented by the signals from the speed sensors 35 and 36. The calculated mean value is used as the vehicle speed data Vf. In the case of vehicle travel along curved roads, the vehicle speed data Vf may be determined by referring to the following equation.

$$Vf = (mVfr + nVfl)/(m+n)$$

where the letters m and n denote weight factors dependent on the angle of turn of a vehicle steering wheel, and the sum of the values m and n equals 1, that is, $m + n = 1$.

A subtractor (no reference character) calculates a deviation or difference between the actual driving wheel speed Vd and the target driving wheel speed Vc. An integrator P5 accumulates or integrates the calculated speed difference and thereby derives an accumulated value Zv(k). This integral part ensures appropriate control of a servo system.

A state estimator P6 referred to as an observer or a Kalman filter deduces or estimates output torque Tq of the engine 1 from a perturbation component $\delta\theta^*$ of an target opening degree of the throttle valve 7, a perturbation component $\delta fr$ of a target fuel injection rate, and the driving wheel rotational speed Vd. The perturbation throttle opening degree $\delta\theta$ and the perturbation fuel injection rate $\delta fr$ constitute portions of operating condition parameters inputted into the engine 1. The driving wheel rotational speed Vd constitutes an operating state parameter outputted from the engine 1. The estimated engine output torque is represented by the character Tq. A perturbation quantity deriving section P8 derives a perturbation quantity or component $\delta Vd$ of the driving wheel rotational speed Vd. The driving wheel speed perturbation quantity $\delta Vd$ is fed to the state estimator P6. The perturbation technique used in this invention relies on the construction of a dynamic model relating to operation of the engine 1. According to the constructed dynamic model, states of the non-linear system, that is, the engine 1, near steady states can be accurately estimated or deduced on the basis of the steady states by means of linear approximation. It should be noted that since the state of the engine 1 varies continuously, linear approximation is applicable. In agreement with the perturbation technique, the driving wheel speed perturbation component $\delta Vd$ with respect to the nearest steady engine operating state is used in handling the rotational speed Vd of the vehicle driving wheels powered by the engine 1. The perturbation throttle opening degree $\delta\theta^*$ and the perturbation fuel injection rate $\delta fr$ are used in handling the throttle valve position $\theta^*$ and the fuel injection rate fr constituting engine input parameters.

The observer P6 estimates a vector state variable $\hat{X}(k)$ representing internal states of the engine 1. Specifically, the state variable $\hat{X}(k)$ is deduced from the perturbation quantities $\delta Vd$, $\delta\theta^*$, and $\delta fr$ by referring to a state equation (I) indicated below. The observer P6 also derives an estimated engine output torque $\delta\hat{T}q$ from the estimated state variable $\hat{X}(k)$ and the driving wheel speed perturbation quantity $\delta Vd(k)$ by referring to an equation (II) indicated below.

$$\hat{X}(k) = [P1]X(k-1) + [Q1 Q2]\begin{bmatrix}\delta fr \\ \delta\theta^*\end{bmatrix} + Q3\, \delta Vd(k-1) \quad \text{(I)}$$

$$\delta\hat{T}q = C1\hat{X}(k) + D1\, \delta Vd(k) \quad \text{(II)}$$

A feedback quantity determination section P7 calculates a vector feed back gain F and thus determines perturbation input controlled quantities ($\delta fr$, $\delta\theta^*$) in accordance with the perturbation estimated torque $\delta\hat{T}q(k)$, the perturbation driving wheel rotational speed $\delta Vd(k)$, and the accumulated value Zv(k) by referring to the following output equations.

$$\delta fr(k) = f11\delta\hat{T}q(k) + f12\delta Vd(k) + f13Zv(k) \quad \text{(III)}$$

$$\delta\theta^*(k) = f21\delta\hat{T}q(k) + f22\delta Vd(k) + f23Zv(k) \quad \text{(IV)}$$

A reference adding section P9 derives final input controlled quantities $\theta^*$ and fr determining the conditions of operation of the engine 1. Specifically, the final controlled quantities $\theta^*$ and fr are determined in accordance with the perturbation components ($\delta fr$, $\delta\theta^*$) and reference base components $\theta a$ and fra. The perturbation quantities ($\delta fr$, $\delta\theta^*$) are measured from the steady engine operating state. The reference base quantities $\theta a$ and frs are chosen to correspond to the steady engine operating state. Accordingly, the final control value $\theta^*$ equals the sum of the perturbation value $\delta\theta^*$ and the base value $\theta a$. The other final control value fr equals the sum of the perturbation value $\delta fr$ and the base value fr.

As apparent from the previous description, the system for controlling output of the engine 1 has two inputs and a single output in this embodiment.

The construction of a dynamic model by system identification, the design of the observer formed by the state estimator P6, and the determination of the optimal feedback gain F will be described hereinafter.

Figure 4:
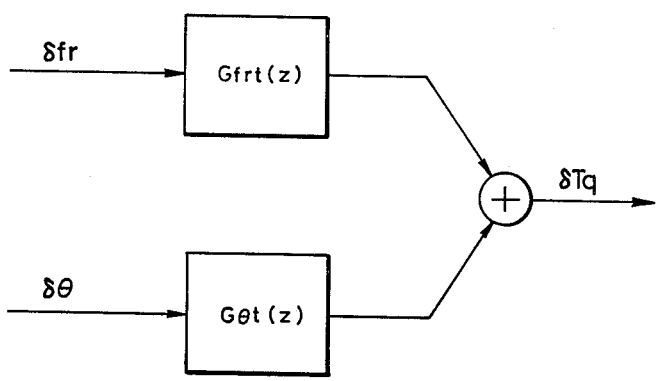
FIGS. 4 and 5 are block diagrams used to identify a model of the system of FIG. 2.

A dynamic model of the engine 1 was constructed as follows. In FIG. 4, the system of the engine 1 in a steady operating state is diagrammatically illustrated as a two-input one-output system by use of transfer functions Gfrt(z) and G$\theta$t(z). The letter z represents z-transform of sampled values of the input and output signals. The transfer functions Gfrt(z) and G$\theta$t(z) have appropriate dimensions. A transfer function matrix G1(z) of the engine 1 is expressed by the following equation.

$$G1(z) = Gfrt(z) + G\theta t(z)$$

Figure 5:
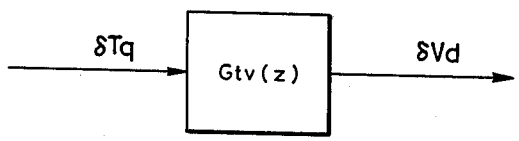

In FIG. 5, the power transmission system between the engine 1 and the driving wheels is diagrammatically illustrated by use of a transfer function Gtv(z) between perturbation output torque $\delta Tq$ of the engine 1 and perturbation speed $\delta Vd$ of the driving wheels. The transfer function Gtv(z) is thus defined in perturbation quantity $\delta$.

A transfer function G(z) of the whole vehicle equals the sum of the engine transfer function G1(z) and the power transmission system transfer function Gtv(z).

While the engine output torque is deduced by an estimator or the like in the vehicle acceleration control system of this invention, the torque was actually detected by a torque sensor and transfer functions were derived from the detected torque data in constructing a dynamic model.

Generally, in the case of a two-input one-output system such as the engine 1 in this embodiment, the input and output values interfere with each other so that determination of a physical model of the system is usually difficult. In such a system, the transfer functions can be derived via conventional system identifications which are a kind of simulation. In modern control theory, there are various well-known system identifications as disclosed in the document "System Identification" written by Setsuo SAGARA, published from Measurement and Automatic Control Society of Japan in 1981. The transfer functions of the system in this embodiment were determined by the system identification using least squares method. The determination of the transfer functions will be described below.

Under present steady operating states of the engine 1 in which a variation $\delta\theta$ in the throttle opening degree remains zero, the fuel injection rate was changed by a variable value $\delta fr$ by applying a suitable test signal to the fuel injection valves. The change of the fuel injection rate caused rotational speed of the driving wheels to change by a variable value $\delta Vd$. During and after the change of the fuel injection rate, the input value $\delta\theta$ and the output value $\delta Vd$ were sampled a preset number of times N. In this way, the input data series $\{u(i)\}=\{\delta fri\}$ and the output data series $\{y(i)\}=\{\delta Vdi\}$ were obtained. It should be noted that $i=1, 2, 3, \ldots N$. In this case, the system is regarded as a one-input one-output system so that the transfer function Gfrt(z) of the system is determined by referring to the following equations.

$$Gfrt(z) = B(z^{-1})/A(z^{-1}) \tag{3}$$

$$Gfrt(z) = (b0 + b1 \cdot z^{-1} + \ldots + bn \cdot z^{-n})/(1 + a1 \cdot z^{-1} + a2 \cdot z^{-2} + \ldots + an \cdot z^{-n}) \tag{4}$$

where the character $z^{-1}$ represents denotes a unit delay or shift operator, and $z^{-1} \cdot X(k) = X(k-1)$.

The system transfer function Gfrt(z) can be derived by determining the parameters $a1 \sim an$ and $b0 \sim bn$ of the equation (4) in accordance with the input and output data series $\{u(i)\}$ and $\{y(i)\}$. In the system identification using least squares method, these parameters $a1 \sim an$ and $b0 \sim bn$ are determined or chosen so that the following summation J0 can be minimized.

$$J0 = \sum_{K=\eta}^{N} [\{y(k) + a1 \cdot y(k-1) + \ldots + an \cdot y(k-n)\} - \{b0 \cdot u(k) + b1 \cdot u(k-1) + \ldots + bn \cdot u(k-n)\}]^2 \tag{5}$$

Figure 6:
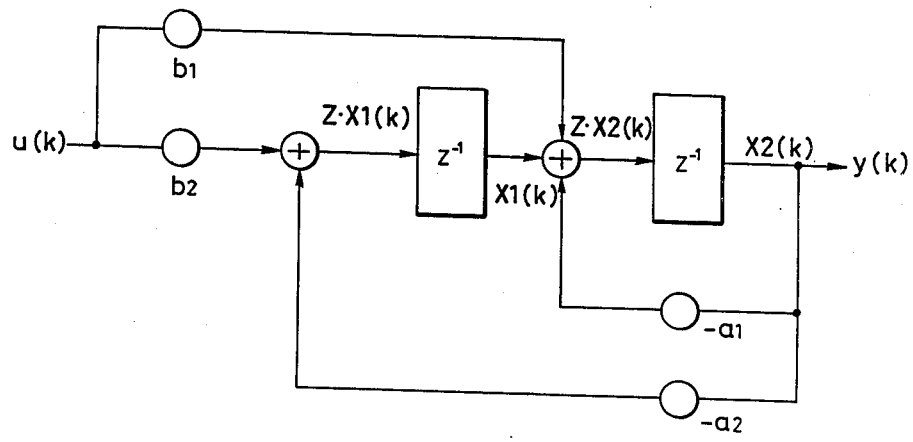
FIG. 6 is a signal flow diagram for determining a transfer function used in the system of FIG. 2.

In this embodiment, the parameters were determined at the value n equal to 2. In this case, signal flow in the system has a manner as shown in FIG. 6, and the state variable is composed of $[X1(k)\ X2(k)]^T$ and the associated state and output equations are indicated below.

$$\begin{bmatrix} X1(k+1) \\ X2(k+1) \end{bmatrix} = z \begin{bmatrix} X1(k) \\ X2(k) \end{bmatrix} \tag{6}$$

$$= \begin{bmatrix} 0 & -a2 \\ 1 & -a1 \end{bmatrix} \begin{bmatrix} X1(k) \\ X2(k) \end{bmatrix} + \begin{bmatrix} b2 \\ b1 \end{bmatrix} u(k)$$

$$y(k) = [0\ 1] \begin{bmatrix} X1(k) \\ X(k) \end{bmatrix} \tag{7}$$

Accordingly, in the case where the system in this embodiment is regarded as a one-input and one-output system, system parameters A, B, and C are respectively defined as A', B', and C' given by the following equations.

$$A1' = \begin{bmatrix} 0 & -a2 \\ 1 & -a1 \end{bmatrix} \tag{8}$$

$$B1' = [b2\ b1]^T$$

$$C1' = [0\ 1]$$

In respect of the system of this embodiment, the parameters in the transfer function Gfrt(z) were determined as follows.

$$[a1\ a2] = [-1.91\ 0.923]$$

$$[b0\ b1\ b2] = [0\ 4.86 \times 10^{-3}\ 4.73 \times 10^{-3}]$$

According to similar method, system parameters A2', B2', and C2' in the transfer function G$\theta$t(z) were determined. The parameters in the original two-input one-output system, that is, the parameters A, B, and C in the state equation (1) and the output equation (2), were derived from the just determined system parameters in the transfer functions.

In this way, the dynamic model of the system of this embodiment was determined through the system identification. The determination of the dynamic model relies on the fact that an operating state of the engine 1 near a preset steady operating state can be expressed by linear approximation with respect to the preset steady operating state. Accordingly, in connection with each of plural steady operating states, a set of transfer functions Gfrt(z), G$\theta$t(z), and Gtv(z) was determined by the previously-mentioned method, and thus a state equation (1) and an output equation (2), that is, parameters A, B, and C, were derived. In this dynamic model, the inputs and the output have fixed relationships in terms of a perturbation quantity $\delta$.

Method of designing an observer will be described hereinafter. In modern control theory, there are various well-known methods of designing an observer, such as Gopinath's method. For example, the book "Basic System Theory" written by Katsuhisa FURUTA and Akira SANO, published from Corona Co. Ltd. in 1978 discloses the details of observer design. In respect of the system of this embodiment, the observer was designed as a finite time settling observer in a well-known way.

The state estimator P6 designed as an observer estimates or deduces a vector variable X(k) of the internal state of the engine 1 from a perturbation value ($\delta$Vd) of the rotational speed of the vehicle driving wheels and the perturbation values ($\delta\theta$, $\delta fr$) of operating conditions of the engine 1, as described previously. In control of the engine 1, the estimated vector state variable $\hat{X}(k)$ determined by the state estimator P6 can be used as an actual vector state variable X(k). This is based on the following fact. It is assumed that the output $\hat{X}(k)$ of the state estimator is expressed by an equation (9) indicated below.

$$\hat{X}(k) = (A - L \cdot C)\hat{X}(k-1) + B \cdot u(k-1) + L \cdot y(k-1) \tag{9}$$

where the letter L represents an arbitrary matrix. The following equation is derived from the equations (1), (2), and (3).

$$[X(k)-\hat{X}(k)]=(A-L\cdot C)[X(k-1)-\hat{X}(k-1)] \quad (10)$$

Accordingly, in the case where the matrix L is chosen so that the eigenvalues of the matrix $(A-L\cdot C)$ will reside within a unit circle, $\hat{X}(k) \to X(k)$ as $k \to \infty$. Thus, the internal state variable $X(k)$ of the controlled object can be accurately deduced or estimated in accordance with series $u(*)$ and $y(*)$ starting from the past input control vector $u(k)$ and the past output control vector $y(k)$ respectively.

Since the system of this embodiment is observable, the parameters A, B, and C in the state equation (1) and the output equation (2) which were determined by system identification using least squares method can be converted into the following observable canonical structures through similar transformation using a regular or nonsingular matrix T and a new state variable $\bar{X}(k) = T^{-1}\cdot X(k)$.

$$\bar{X}(k) = \bar{A}_0 \cdot \bar{X}(k-1) + \bar{B}_0 \cdot u(k-1) \quad (11)$$

$$y(k) = \bar{C}_0 \cdot \bar{X}(k) \quad (12)$$

where $\bar{A}_0 = T^{-1}\cdot A\cdot T$, $\bar{B}_0 = T^{-1}\cdot B$, and $\bar{C}_0 = C\cdot T$. When the regular matrix T is chosen appropriately, the parameters $\bar{A}_0$, $\bar{B}_0$, and $\bar{C}_0$ can be given by equations (13), (14), and (15) as follows.

$$\bar{A}_0 = \begin{bmatrix} 0 & 0 & \cdots & -\alpha 1 \\ 1 & 0 & \cdots & -\alpha 2 \\ 0 & 1 & \cdots & \vdots \\ \vdots & & \ddots & \vdots \\ 0 & 0 & \cdots & 1 & -\alpha n \end{bmatrix} \quad (13)$$

$$\bar{B}_0 = [\beta 1\ \beta 2\ \ldots\ \beta n]^T \quad (14)$$

$$\bar{C}_0 = [0\ 0\ \ldots\ 1] \quad (15)$$

When the matrix L in the equation (10) is chosen such that $L=[-\alpha 1 -\alpha 2 \ldots -\alpha n]^T$, the following equation (16) is derived from the equations (13), (14), and (15).

$$\bar{A}_0 - L\cdot \bar{C}_0 = \begin{bmatrix} 0 & 0 & \cdots & 0 \\ 1 & 0 & \cdots & 0 \\ 0 & 1 & \cdots & 0 \\ \vdots & & \ddots & \vdots \\ 0 & 0 & \cdots & 1 & 0 \end{bmatrix} \quad (16)$$

In accordance with the above-mentioned process, the finite time settling observer was designed. It should be noted that the similar transformation to derive the parameters $\bar{A}_0$, $\bar{B}_0$, and $\bar{C}_0$ from the parameters A, B, and C does not affect correctness and accuracy of the control based on the state equation. In other words, even though the parameters $\bar{A}_0$, $\bar{B}_0$, and $\bar{C}_0$ were derived through the similar transformation from the parameters A, B, and C, correctness and accuracy of the control based on the state equation is ensured and maintained.

As described previously, the state estimator P6 was designed in accordance with the parameters A, B, and C in the equation (1) and in other equations which were determined by the system identification. The output of the state estimator P6 will be represented by the character $\hat{X}(k)$ again.

In modern control therapy, there are well-known methods of determining optimal feedback gains as disclosed in the previously-mentioned book "Linear System Control Theory". In this embodiment, the optimal feedback gain was determined in a known way as indicated hereinafter. First, a vector engine operating condition value $u(k)$ and a vector engine operating state value $y(k)$ are defined as follows.

$$\delta u(k) = u(k) - u(k-1) \quad (17)$$

$$\delta y(k) = y(k) - y(k-1) \quad (18)$$

Control problem of the integral-added optimal regulator can be solved by determining optimal control input, that is, operating condition $u^*(k)$, at which the following performance index J is minimized.

$$J = \sum_{k=0}^{\infty} [\delta y^T(k)\cdot Q\cdot \delta y(k) + \delta u^T(k)\cdot R\cdot \delta u(k)] \quad (19)$$

where the letters Q and R denote weight parameter matrices and the letter k denotes a number of times of sampling which is zero at the initiation of the control. The right-hand side of the equation (19) takes a quadratic form where the matrices Q and R can be diagonal.

The optimal feedback gain F is given by the following equation.

$$F = -(R + \bar{B}^T\cdot P\cdot \bar{B})^{-1}\cdot \bar{B}^T\cdot P\cdot \bar{A} \quad (20)$$

The parameters $\bar{A}$ and $\bar{B}$ in the equation (20) are defined as follows.

$$\bar{A} = \begin{bmatrix} 1 & -\bar{C}_0\cdot \bar{A}_0 \\ 0 & \bar{A}_0 \end{bmatrix} \quad (21)$$

$$\bar{B} = \begin{bmatrix} -\bar{C}_0\cdot \bar{B}_0 \\ \bar{B}_0 \end{bmatrix} \quad (22)$$

The letter P in the equation (20) denotes a solution of Riccati equation (23) indicated below.

$$P = \bar{A}^T\cdot P\cdot \bar{A} - \bar{A}^T\cdot P\cdot \bar{B}\cdot (\bar{B}^T\cdot P\cdot \bar{B} + R)^{-1}\cdot \quad (23)$$

$$\bar{B}^T\cdot P\cdot \bar{A} + \begin{bmatrix} Q & 0 \\ 0 & 0 \end{bmatrix}$$

The performance index J of the equation (19) is designed so as to minimize the deviation of the condition state values $y(k)$, constituting control output and including at least the value $\delta Vd$, from the target values $y^*(k)$ while restricting or limiting movement of the operating condition values $u(k) = [\delta\theta\ \delta fr]$ constituting control inputs to the engine 1. The restriction or limitation on the operating condition values $u(k)$ can be varied by changing the values in the weight matrices Q and R.

Accordingly, when the solution P is determined in accordance with the previously-derived dynamic model of the engine 1, that is, the matrices A, B, and C (or the matrices $\bar{A}$, $\bar{B}$, and $\bar{C}$) and also with appropriately selected weight parameter matrices Q and R by referring to the equation (23) and then the optimal feed-back gain F is caluclated by referring to the equation (20), the state variable $\hat{X}(k)$ is derived from the equation (9) in terms of the estimated state variable X(k) and is expressed in terms of the perturbation value $\delta\hat{T}q$ by the equation (II) so that the perturbation values δu(k) of the control input operating conditions of the engine 1 are determined by referring to the following equation.

$$\delta u(k) = F \cdot [\delta \hat{T}q(k) \delta Vd(k) Zv(k)] \quad (24)$$

Since the system of this embodiment is of the servo type, the control input perturbation values δu(k) of the equation (24) include the value Zv(k). The optimal feedback gain F was determined by reiterating the above-mentioned simulation while varying the weight parameter matrices Q and R until desirable control characteristics were obtained.

A dynamic model of the control system of the engine 1 was constructed by the system identification using least squares method as described previously. In addition, a finite time settling observer was designed as described previously. Furthermore, the optimal feedback gain F was calculated as described previously. The model construction, the observer design, and the gain calculation were performed beforehand. In the actual control of the engine 1 or the vehicle, the control circuit 40 uses the results of the beforehand-performed model construction, observer design, and gain calculation.

Figure 7:
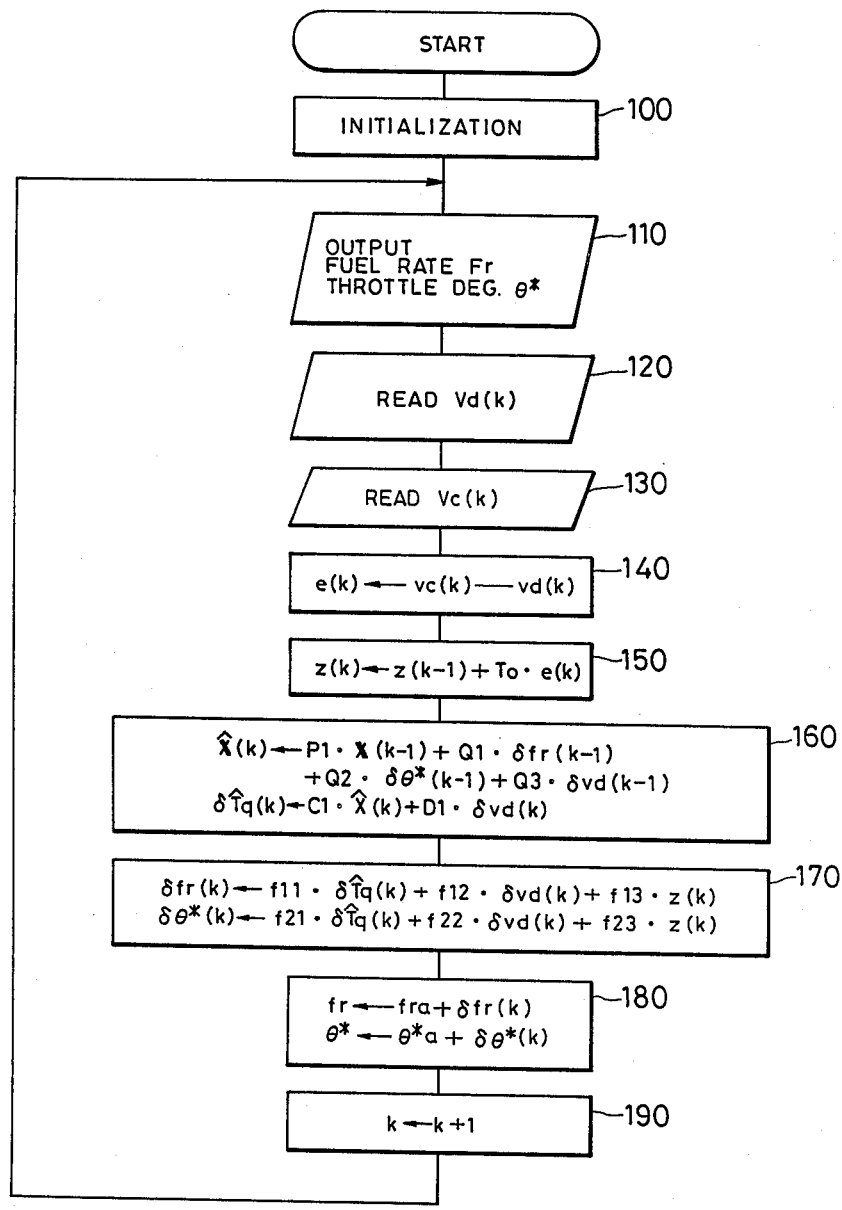
FIG. 7 is a flowchart of an output control program executed in the control cirucuit of FIG. 2.
Figure 8:
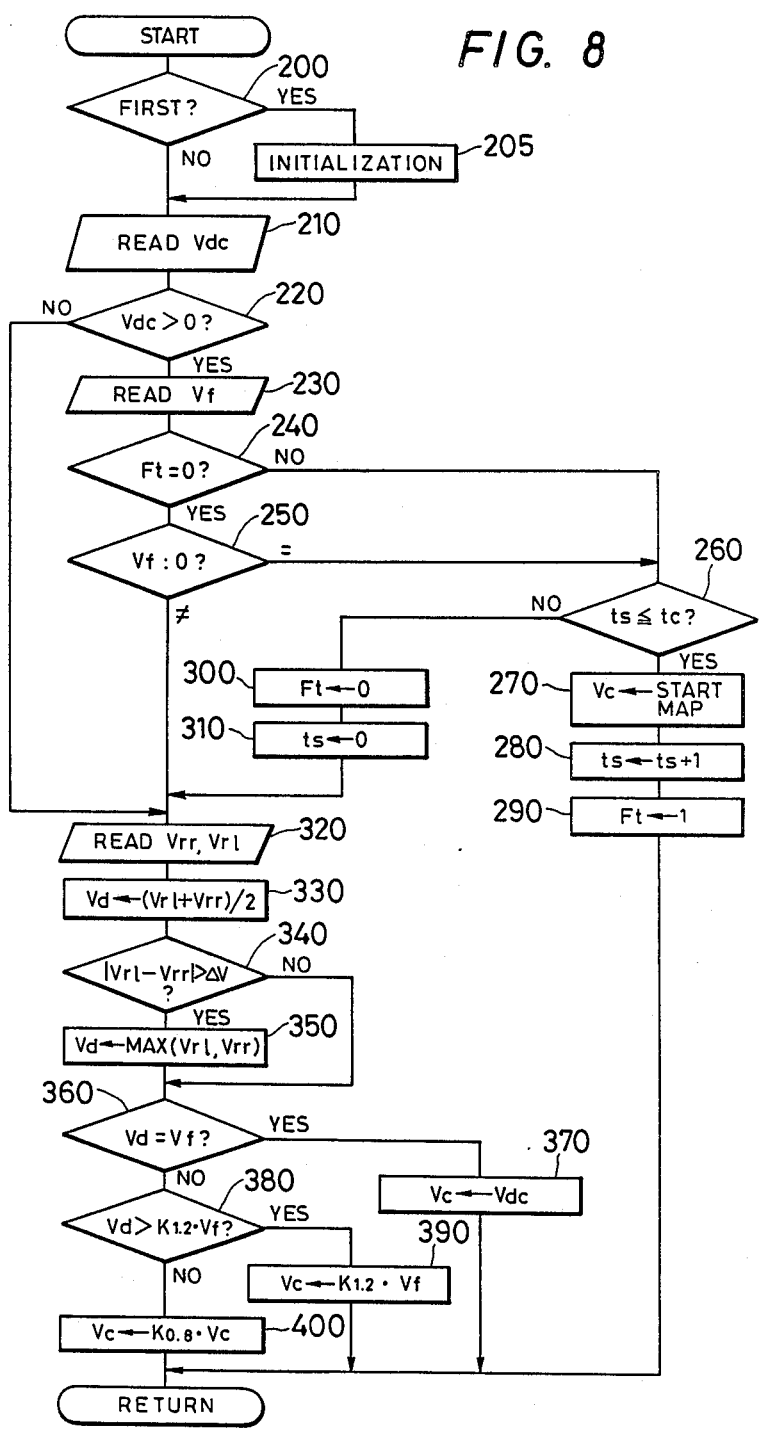
FIG. 8 is a flowchart of a target value calculation program executed in the control circuit of FIG. 2.

Actual operation of the control circuit 40 will be described hereinafter with reference to FIGS. 7 and 8. The control circuit 40 operates in accordance with a program stored in the ROM 45. The program includes an output control routine, the flowchart of which is shown in FIG. 7. As will be made clear hereinafter, a major poriton of the output control routine reiterates periodically. In the flowchart of FIG. 7, the adscript (k) represents that the associated value is determined in the current execution cycle of the program while the adscript (k−1) represents that the associated value is determined in the preceding execution cycle of the program. The program also includes a target or command value calculation routine, the flowchart of which is shown in FIG. 8. The target value calculation routine is periodically executed at fixed time intervals via interrupt process.

The output control routine will be described in detail hereinafter. As shown in FIG. 7, a first step 100 of the output control routine initializes variables and flags. After the step 100, the program advances to a step 110.

The step 110 controls the fuel injection valve or valves 11 in accordance with a target or command fuel injection rate fr determined in the preceding exectuion cycle of the program. In addition, the step 110 controls the throttle valve 7 via the actuator 32 in accordance with a target or command throttle opening degree θ* determined in the preceding execution cycle of the program.

A step 120 following the step 110 reads or derives the actual current driving wheel rotational speed Vd(k).

A step 130 following the step 120 reads a target or command driving wheel rotational speed Vc(k).

A step 140 calculates the difference e(k) between the actual driving wheel rotational speed Vd(k) and the target driving wheel rotational speed Vc(k).

A step 150 determines the accumulated value Z(k) of the difference e(k) by referring to the following equation.

$$Z(k) = Z(k-1) + T_0 \cdot e(k)$$

where the letter $T_0$ denotes a constant time interval.

A step 160 following the step 150 determines estimated values $\hat{X}(k)$ of the state variable X(k) of the engine 1 by referring to the previously-mentioned equation (I). Also, the step 160 determines a perturbation value $\delta\hat{T}q$ of the estimated engine torque on the basis of the estimated engine state values $\hat{X}(k)$ by referring to the previously-mentioned equation (II).

A step 170 following the step 160 determines a target fuel injection perturbation value δfr(k) in accordance with the estimated torque perturbation value $\delta\hat{T}q(k)$, the driving wheel rotational speed perturbation value δVd, the accumulated value Z(k), and the predetermined feedback gain F by referring to the previously-mentioned equation (III). Also, the step 170 determines a target throttle opening degree perturbation value δθ*(k) in accordance with the estimated torque perturbation value $\delta\hat{T}q(k)$, the driving wheel rotational speed perturbation value δVd, the accumulated value Z(k), and the predetermined feedback gain F by referring to the previously-mentioned equation (IV).

A step 180 following the step 170 determines a final target or command fuel injection rate fr equal to the sum of the command fuel injection perturbation rate δfr(k) and a reference fuel injection rate fra occuring under the steady state which constitutes a starting or base point of the perturbation calculation. Also, the step 180 determines a final target or command throttle opening degree θ* equal to the sum of the target perturbation throttle opening degree δθ*(k) and a reference throttle opening degree θ*a occuring under the steady state.

A step 190 following the step 180 increments the value k by "1". For example, the value k is represented by a signal from a counter within the control circuit 40.

After the step 190, the program returns to the step 110. Accordingly, the steps 110–190 reiterate periodically.

The target value calculation routine will be desribed hereinafter with reference to FIG. 8. During execution of the previously-mentioned output control routine, the target value calculation routine is periodically executed at fixed time intervals via interrupt process. The target value calculation routine corresponds to the driving wheel rotational speed/slip wheel detection section P3 and the target rotational speed determination section P1 in FIG. 3. Accordingly, the target value calculation routine determines the target driving wheel speed Vc represented by the character Vc(k) in FIG. 7.

As shown in FIG. 8, a first step 200 of the target value calculation routine determines whether or not the current execution cycle of the program is the first after the start of the engine 1. When the current execution cycle is the first, the program advances to a step 205. When the current execution cycle is not the first, the program advances to a step 210.

The step 205 initializes variables and flags used in the progam. After the step 205, the program advances to the step 210.

The step 210 reads or derives the required acceleration rate Vdc from the signal outputted by the sensor 33. After the step 210, the progam advances to a step 220.

The step 220 determines whether or not the required acceleration rate Vdc exceeds zero. When the requied acceleration rate Vdc does not exceed zero, that is, when the accelerator pedal is fully released so that the required acceleration rate is zero, the program jumps to a step 320. When the required acceleration rate Vdc exceeds zero, that is, when the accelerator pedal is at least partially depressed, the program advances to a step 230.

The step 230 derives the current vehicle speed Vf from the signals outputted by the front wheel rotational speed sensors 35 and 36. After the step 230, the program advances to a step 240.

The step 240 determines whether or not the flag Ft representing vehicle start control is reset. When the flag Ft is reset or "0", that is, when the vehicle is in a state other than a starting state, the program advances to a step 250. When the flag Ft is set or "1", that is, when the vehicle is in a starting state, the program advances to a step 260.

The step 250 determines whether or not the vehicle speed Vf is zero. When the vehicle speed is zero, the program advances to the step 260. When the vehicle speed Vf is not zero, the progam advances to the step 320.

Accordingly, when the vehicle has not yet started, the program moves from the step 240 to the step 260 by way of the step 250. When the vehicle is starting, the program moves from the step 240 directly to the step 260. In other cases, the program moves from the step 240 to the step 250 and then directly proceeds to the step 320.

The step 260 determines whether or not the value ts represented by a signal from a timer counter within the control circuit 40 is equal to or less than a positive preset value tc. It should be noted that the time value ts was initialized to zero by the previous step 205. As will be made clear hereinafter, the variable ts represents the time elapsed since the moment of the initiation of vehicle start. When the time value ts is equal to or less than the preset value tc, the program advances to a step 270. When the time value ts is greater than the preset value tc, the program advances to the steps 320 by way of steps 300 and 310 in which the starting control flag Ft and the time value ts are reset to "0".

The step 270 determines a target or command driving wheel rotational speed Vc in accordance with the time value ts by referring to a start speed map stored in the ROM 45 in which a set of target driving wheel rotational speeds are plotted as a function of the time value.

Figure 9:
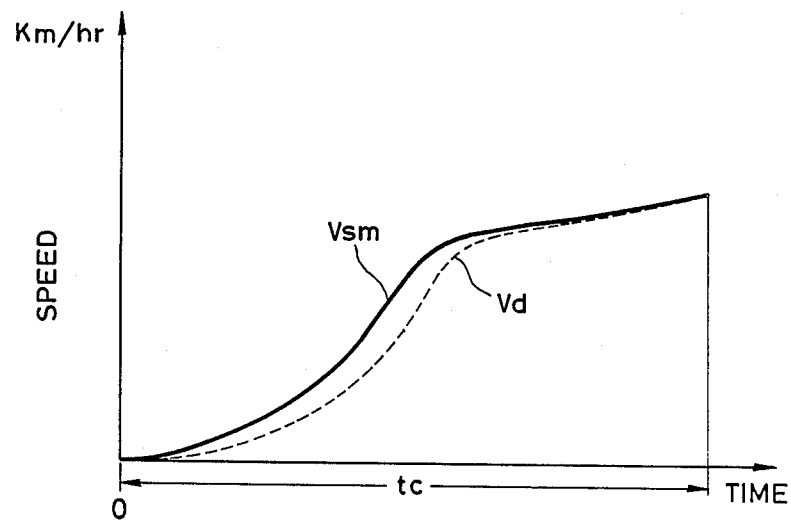
FIG. 9 is a graph showing a start speed map.

The start speed map is shown in FIG. 9 where the relationship between the target driving wheel rotational speed and the time value is denoted by the solid curve Vsm. In FIG. 9, the broken curve Vd denotes the actual driving wheel rotational speed. As shown in FIG. 9, the actual driving wheel rotational speed closely follows the target driving wheel rotational speed.

A step 280 subsequent to the step 270 increments the time value ts by "1". Accordingly, the variable ts represents the time elapsed in unit of the fixed time interval between adjacent execution cycles of the target value calculation routine.

A step 290 following the step 280 sets the flag Ft to "1". After the step 290, the target value calculation routine ends and the program returns to a main routine.

The step 320 reads the current left-hand driving wheel speed Vrl and the current right-hand driving wheel speed Vrr from the signals outputted by the vehicle wheel speed sensors 37 and 38.

A step 330 following the step 320 calculates a mean value Vd between the left-hand wheel speed Vrl and the right-hand wheel speed Vrr. Specifically, "Vd←(Vrl+Vrr)/2" is executed.

A step 340 following the step 330 determines whether or not the difference between the left-hand wheel speed Vrl and the right-hand speed Vrr exceeds a preset value $\Delta V$ corresponding to a lower limit above which one of the driving wheels is excessively slipping or racing in comparison with the other. When the wheel speed difference exceeds the preset value $\Delta V$, that is, when one of the driving wheels is excessively slipping in comparison with the other, the program advances to a step 350. When the wheel speed difference does not exceed the preset value $\Delta V$, that is, when there is no considerable difference in slip ratio between the two driving wheels, the program jumps to a step 360.

The step 350 replaces the driving wheel speed value Vd by the greater of the driving wheel speed Vrl and Vrr. Accordingly, when one of the driving wheels is excessively slipping in comparison with the other, the speed value Vd equals the greater of the driving wheel speeds Vrl and Vrr. In other cases, the speed value Vd equals the mean value between the driving wheel speeds Vrl and Vrr. After the step 350, the program advances to the step 360.

The step 360 determines whether or not the the driving wheel speed Vd essentially equals the vehicle speed Vf. Specifically, a determination is made as to whether or not the driving wheel speed Vd resides within a preset range around the vehicle speed Vf. When the driving wheel speed Vd essentially equals the vehicle speed Vf, that is, when any appreciable slips of the driving wheels do not occur, the program advances to a step 370. When the driving wheel speed Vd does not essentially equal the vehicle speed Vf, that is, when appreciable slips of the driving wheels occur, the program advances to a step 380.

The step 370 sets the target driving wheel speed Vc equal to the required acceleration rate Vdc.

Accordingly, when any appreciable slips of the driving wheels do not occur, the required acceleration rate Vdc is directly used as the target speed Vc. After the step 370, the target value calculation routine ends and the program returns to the main routine.

The step 380 determines whether or not the driving wheel speed Vd exceeds the vehicle speed Vd multiplied by a constant $K_{1.2}$. The constant $K_{1.2}$ preferably equals 1.2 at which maximal friction usually occurs between the driving wheels and the road surfaces. When the driving wheel speed Vd exceeds the vehicle speed Vf multiplied by the constant $K_{1.2}$, the progam advances to a step 390. When the driving wheel speed Vd does not exceed the vehicle speed Vf multiplied by the constant $K_{1.2}$, the program advances to a step 400.

The step 390 sets the target driving wheel speed Vc equal to the vehicle speed Vf multiplied by the constant $K_{1.2}$. Accordingly, the target speed Vc generally has an upper limit equal to the constant $K_{1.2}$ times the vehicle speed Vf. After the step 390, the target value calculation routine ends and the program returns to the main routine.

The step 400 sets the target driving wheel speed Vc equal to the preceding target speed Vc multiplied by a constant $K_{0.8}$ smaller than 1.0. The preceding target speed Vc is defined as being obtained in the execution cycle of the target value calculation routine which precedes the current execution cycle of the target value calculation routine. The constant $K_{0.8}$ preferably equals 0.8. After the step 400, the target value calculation routine ends and the program returns to the main routine.

As described previously, the target value calculation routine determines the target driving wheel speed Vc and the value Vd representative of the actual driving wheel speed, which are used in the output control routine in FIG. 7.

Figure 10:
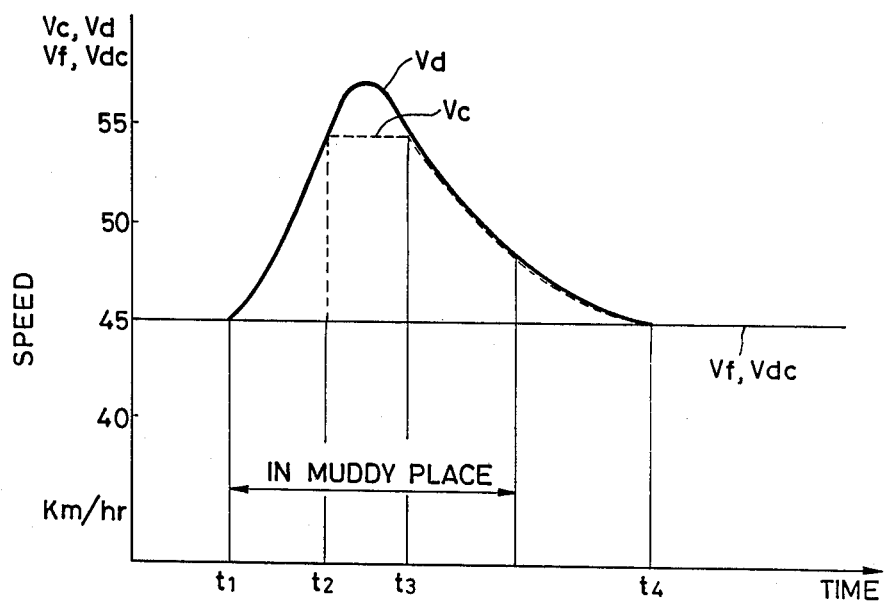
FIG. 10 is a timing diagram showing conditions of the vehicle controlled by the system of FIG. 2.

FIG. 10 shows a timing chart of the actual driving wheel speed Vd, the target driving wheel speed Vc, the vehicle speed Vf, and the required acceleration rate Vdc when the vehicle equipped with the acceleration control system of this embodiment moves into a muddy place, an iced place, or a place spoiled by oil.

As shown in FIG. 10, in the case where the vehicle driver continuously requires the engine 1 to maintain the vehicle speed Vf at a value of 45 kilometers per hour (km/hr) through accelerator pedal manipulation, when the driving wheels enter a muddy place at a moment t1, the driving wheels start slipping. After the moment t1, the driving wheels continue to slip and thus their speed Vd increases. At a moment t2 following the moment t1, the driving wheel speed Vd reaches a value equal to the constant $K_{1.2}$ times the vehicle speed Vf, e.g., equal to 54 km/hr, so that the target driving wheel speed Vc is set equal to the constant $K_{1.2}$ times the vehicle speed Vf and specifically "Vc←$K_{1.2}$.Vf" is executed. During a certain period following the moment t2, the driving wheel speed Vd further increases and thus the target speed Vc remains held or limited to the constant $K_{1.2}$ times the vehicle speed Vf. After this period, the driving wheel speed Vd starts dropping as a result of the limitation on the target speed Vc. At a moment t3 following the moment t2, the driving wheel speed Vd drops to the constant $K_{1.2}$ times the vehicle speed Vf, e.g., to 54 km/hr, so that the current target speed Vc is set equal to the constant $K_{0.8}$ times the preceding target speed Vc and specifically "Vc←$K_{0.8}$.Vc" is executed. This setting reduces the target speed Vc, since the constant $K_{0.8}$ is smaller than 1.0. After the moment t3, the target speed Vc remains reduced by the periodical exectuions of "Vc←$K_{0.8}$.Vc" and thus the driving wheel speed Vd also drops until the driving wheel speed Vd becomes equal to the vehicle speed Vf at a moment t4. In travel along a series of muddy places, after the first slip of the driving wheels, the vehicle driver generally decreases the degree of depression of the accelerator pedal so that the vehicle speed usually drops to a safe level.

As described previously, in this embodiment, the vehicle driving wheels are controlled by the feedback control system including the vehicle powering engine 1. The output torque Tq of the engine 1 is deduced by the state estimator P6. The optimal feedback gains are predetermined on the basis of a dynamic model of the system powering the driving wheels. Furthermore, the target throttle opening degree $\theta^*$ and the target fuel injection rate fr are determined in accordance with the estimated torque $\hat{T}q$, the driving wheel speed Vd, the difference between the actual driving wheel speed Vd and the target driving wheel speed Vc, and the optimal feedback gains. The engine 1 is controlled in accordance with these target values $\theta^*$ and fr which constitute feedback quantities. The estimated torque Tq is generally accurate so that rotation of the driving wheels are controlled finely and precisely. The estimation of the engine output torque makes a torque sensor unnecessary. Since the target driving wheel speed Vc is set to correspond to a slip ratio equal to or less than 20%, the driving wheels can usually undergo maximal frictions from the road surfaces.

Furthermore, in this embodiment, the appropriately designed vehicle start speed map allows a smooth start of the vehicle. In addition, the fuel injection rate and the throttle opening degree can be controlled independently. Also, the traction control is effected on the basis of the behavior of one of the two driving wheels which is slipping at a higher rate, so that smooth acceleration of the vehicle is enabled.

What is claimed is:

1. An acceleration control system for a vehicle having at least one driving wheel powered by an engine, the system comprising:
    (a) means for detecting required acceleration rate;
    (b) means for detecting speed of the vehicle;
    (c) means for detecting rotational speed of the driving wheel;
    (d) means for adjusting rate of air flow into the engine in accordance with an adjustable controlled quantity;
    (e) acceleration control means for determining a target rotational speed in accordance with the detected required acceleration rate, the target rotational speed having an upper limit equal to a rotational speed of the driving wheel corresponding to a preset slip ratio with respect to the detected vehicle speed, the acceleration control means being operative to feedback-control the controlled quantity of the air adjusting means so that the detected rotational speed of the driving wheel essentially equals the target rotational speed;
    wherein the acceleration control means comprises means for estimating output torque of the engine in accordance with the detected rotational speed of the driving wheel and the controlled quantity of the air adjusting means, and the acceleration control means is formed as an integral-added optimal regulator which determines the controlled quantity of the air adjusting means in accordance with optimal feedback gains, the estimated engine torque output, the detected rotational speed of the driving wheel, and the target rotational speed, and which performs the feedback control, the optimal feedback gains being predetermined according to a dynamic model of a system powering the driving wheel.

2. The acceleration control system of claim 1 wherein the upper limit of the target rotational speed is chosen to correspond to a slip ratio of 20%.

3. The acceleration control system of claim 1 wherein the driving wheel speed detecting means comprises means for detecting rotational speed of a first driving wheel and means for detecting rotational speed of a second driving wheel, and wherein the acceleration control means is operative to detect when one of the driving wheels slips at a higher rate than the other, and is operative to use the detected rotational speed of the driving wheel slipping at the higher rate in determining the target rotational speed.

4. The acceleration control system of claim 1 further comprising means for detecting start of the vehicle, and wherein during the vehicle start, the acceleration control means is operative to determine the target rotational speed in accordance with time elapsed since an initiation of the vehicle start.

5. The acceleration control system of claim 1 further comprising means for adjusting rate of fuel supply to the engine in accordance with an adjustable controlled quantity, and wherein the acceleration control means is operative to adjust the controlled quantity of the fuel adjusting means in accordance with the optimal feedback gain, the estimated engine output torque, the detected rotational speed of the driving wheel, and the target rotational speed.

6. An acceleration control system for a vehicle having at least one driving wheel powered by an engine, the system comprising:
    (a) means for detecting a speed of the vehicle;
    (b) means for detecting a rotational speed of the at least one driving wheel;
    (c) means for adjusting a rate of air flow into the engine in accordance with an adjustable controlled quantity; and
    (d) drive system control means for determining a target rotational speed of the driving wheel in accordance with the detected vehicle speed and with the detected rotational speed of the driving wheel, and for controlling the air flow rate adjusting means to control the rotational speed of the driving wheel such that the rotational speed approaches the determined target rotational speed of the driving wheel;
    wherein the drive system control means comprises:
    (d1) means for estimating an output torque of the engine in accordance with the detected rotational speed of the driving wheel and with the controlled quantity of the air adjusting means; and
    (d2) means for determining the controlled quantity of the air flow rate adjusting means in accordance with the estimated engine torque output, with the detected rotational speed of the driving wheel, and with the determined target rotational speed of the driving wheel.

7. The acceleration control system of claim 6 wherein the target rotational speed of the driving wheel is within predetermined limits including an upper limit equal to a rotational speed of the driving wheel corresponding to a preset slip ratio with respect to the detected vehicle speed, and wherein the upper limit of the target rotational speed is chosen to correspond to a slip ratio of 20%.

8. The acceleration control system of claim 6 wherein there are two driving wheels, and the driving wheel speed detecting means comprises means for detecting a rotational speed of a first driving wheel and means for detecting a rotational speed of a second driving wheel, and wherein the drive system control means includes means for detecting when one of the driving wheels slips at a higher rate than the other, and means for using the detected rotational speed of the driving wheel slipping at the higher rate in determining the target rotational speed of the driving wheel.

9. The acceleration control system of claim 6 further comprising means for detecting a start of the vehicle, and wherein, the drive system control means includes means for determining the target rotational speed of the driving wheel during the vehicle start in accordance with a time elapsed since an initiation of the vehicle start.

10. An acceleration control system for a vehicle having at least one driving wheel powered by an engine, the system comprising:
    (a) means for detecting a speed of the vehicle;
    (b) means for detecting a rotational speed of the driving wheel;
    (c) means for adjusting a rate of fuel supply to the engine in accordance with an adjustable controlled quantity; and
    (d) drive system control means for determining a target rotational speed of the driving wheel in accordance with the detected vehicle speed and with the detected rotational speed of the driving wheel, and for controlling the fuel adjusting means to control the rotational speed of the driving wheel to approach the determined target rotational speed of the driving wheel;
    wherein the drive system control means comprises:
    (d1) means for estimating an output torque of the engine in accordance with the detected rotational speed of the driving wheel and with the controlled quantity of the fuel adjusting means; and
    (d2) means for determining the controlled quantity of the fuel adjusting means in accordance with the estimated engine torque output, with the detected rotational speed of the driving wheel, and with the determined target rotational speed of the driving wheel.

11. The acceleration control system of claim 10 wherein the target rotational speed of the driving wheel is within predetermined limits including an upper limit equal to a rotational speed of the driving wheel corresponding to a preset slip ratio with respect to the detected vehicle speed, and wherein the upper limit of the target rotational speed is chosen to correspond to a slip ratio of 20%.

12. The acceleration control system of claim 10 wherein there are two driving wheels, and the driving wheel speed detecting means comprises means for detecting a rotational speed of a first driving wheel and means for detecting a rotational speed of a second driving wheel, and wherein the drive system control means includes means for detecting when one of the driving wheels slips at a higher rate than the other, and means for using the detected rotational speed of the driving wheel slipping at the higher rate in determining the target rotational speed of the driving wheel.

13. The acceleration control system of claim 10 further comprising means for detecting a start of the vehicle, and during the vehicle start, the drive system control means includes means for determining the target rotational speed of the driving wheel in accordance with a time elapsed since an initiation of the vehicle start.

14. An acceleration control system for a vehicle having at least one driving wheel powered by an engine, the system comprising:
    (a) means for detecting a speed of the vehicle;
    (b) means for detecting a rotational speed of the driving wheel;
    (c) means for adjusting a torque output of the engine in accordance with an adjustable controlled quantity; and (d) drive system control means for determining a target rotational speed of the driving wheel in accordance with the detected vehicle speed and with the detected rotational speed of the driving wheel, and for controlling the torque output adjusting means so that the detected rotational speed of the driving wheel substantially equals the target rotational speed of the driving wheel;

wherein the drive system control means comprises:

(d1) means for calculating a perturbation component of the detected rotational speed of the driving wheel which is measured from a rotational speed of the driving wheel under a steady engine operating condition, using a predetermined dynamic model related to the engine under the steady engine operating condition;

(d2) means for estimating an output torque of the engine in accordance with the perturbation component of the detected rotational speed of the driving wheel, and with a perturbation component of the controlled quantity of the torque adjusting means; and (d3) means for determining the controlled quantity of the torque output adjusting means in accordance with the estimated engine torque output, with the perturbation component of the detected rotational speed of the driving wheel, and with the detected target rotational speed of the driving wheel.

15. The acceleration control system of claim 14 wherein the torque output adjusting means comprises means for adjusting a rate of air flow into the engine.

16. The acceleration control system of claim 14 wherein the torque output adjusting means comprises means for adjusting a rate of fuel supply to the engine.

17. The acceleration control system of claim 14 wherein the torque output adjusting means comprises means for adjusting a rate of air flow into the engine and means for adjusting a rate of fuel supply to the engine.

* * * * *